Dec. 8, 1925.                    1,564,291
L. H. STANFORD
METHOD OF PREPARING MOTION PICTURE TITLES
Filed Oct. 28, 1922
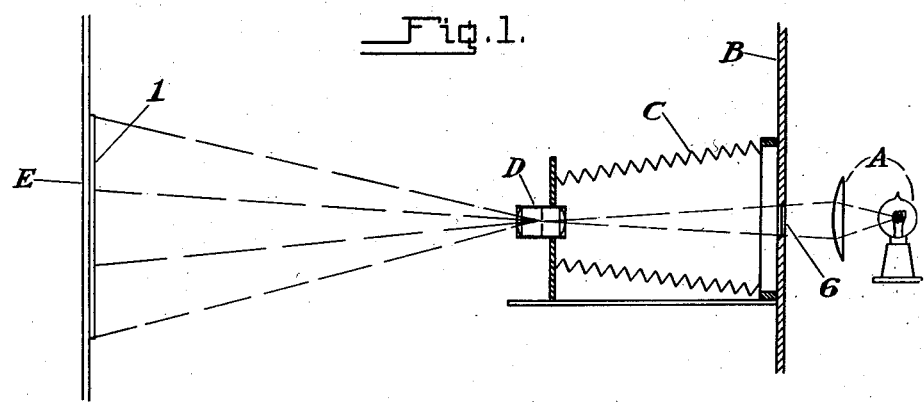
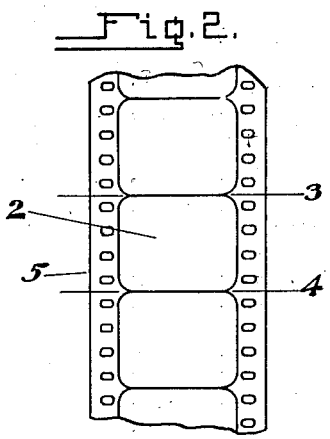
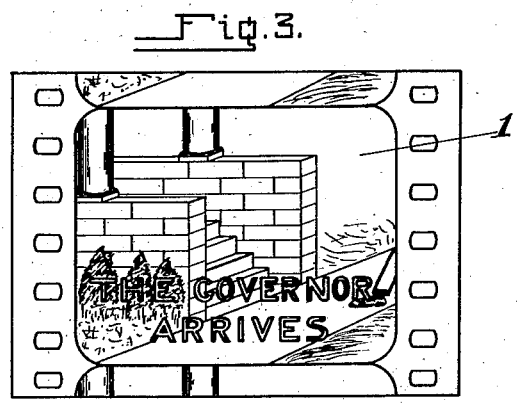
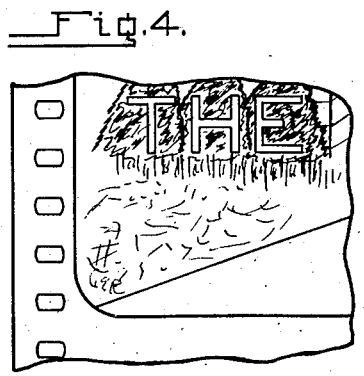
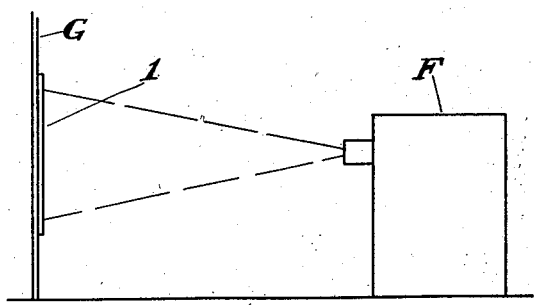
Inventor
Leland H. Stanford
By Robert H. Young
Attorney Patented Dec. 8, 1925.

1,564,291

UNITED STATES PATENT OFFICE.

LELAND H. STANFORD, OF OKMULGEE, OKLAHOMA.

METHOD OF PREPARING MOTION-PICTURE TITLES.

Application filed October 28, 1922. Serial No. 597,574.

*To all whom it may concern:*

Be it known that I, LELAND H. STANFORD, citizen of the United States, residing at Okmulgee, in the county of Okmulgee and State of Oklahoma, have invented certain new and useful Improvements in Methods of Preparing Motion-Picture Titles, of which the following is a specification.

This invention relates to an improved method of arresting the movements of a motion picture by the introduction into the film of an insert prepared from a frame of the film, a particular object being to enable a person making a film to prolong for any desired length of time the pose and scene presented by any frame of the film.

An object of this invention is to provide means of emphasizing certain frames by repeating them in the print as many times as is desired. This feature is of particular value in educational films as will be understood.

It is also an object of this invention to provide a suitable process for the preparation of a title or subtitle from a frame of the scene that the title is to introduce, thus enabling the presentation of a title that has approximately the density of the scene that it introduces, thereby minimizing optical strain and fatigue. This enables the presentation of a title that prepares the audience for the scene that is to follow by acquainting the spectator with the setting of the scene and the initial position of the characters.

A further object is to provide a process for the preparation of a title or a subtitle from a frame of the scene showing several persons or objects, and with lettering indicating exactly to the audience the persons or objects to which it is desired to draw attention, this feature being of particular value in topical films.

The conventional practice in preparing titles is to photograph the title card, which may be a drawing, photograph, or lettered card. The proposed process varies from this practice in that the title card is an enlargement from the first frame of the scene that the title is intended to precede and introduce and the picture of the title is in register with the picture of the scene that follows it. The making of an insert, as distinguished from the title, from a frame of motion picture film possesses advantageous features novel over the present art.

It is therefore proposed to provide such a method consisting generally of the following steps: the enlarging of the frame of motion picture film; the execution upon this enlargement of such lettering or marking as it may be desired to introduce; the registering and focusing of this enlargement, with or without lettering as the case may be, on the film in the camera so that the relation of the objects in the image of the enlargement will have the same relation to the perforations of the film in the camera as do those in the frame from which the enlargement was made; the copying from the enlargement onto as many frames of film as it is desired to take; the finishing of the film on which the copy is made; and the splicing of the copy into the original film or a duplicate of it.

In order that the invention may be more clearly understood, there is disclosed a specific embodiment of my invention as illustrated in the accompanying drawings in which:

Figure 1 is a diagrammatical illustration of the apparatus employed for making the enlargement from the frame of the motion picture film.

Figure 2 is a plan view of a motion picture film containing the frame from which the enlargement is to be made.

Figure 3 is a plan view of the photographic enlargement after finishing and lettering.

Figure 4 is a fractional view taken from Figure 3 illustrating a type of lettering that shows clearly whether it be executed on a background that is light, neutral, or dark in tone.

Figure 5 is a diagrammatical illustration of the arrangement of the apparatus for copying the enlargement onto a motion picture film.

Referring more particularly to the drawings, the source of light is indicated at A and consists of an illuminant of suitable type and an optical system of suitable type for concentrating the light rays uniformly over the frame of the film 6. A screen B is arranged to shut off extraneous light from the easel E and to limit the light reaching the easel E, to those rays passing through the lens D. Bellows C, or other suitable apparatus is provided for permitting the position of the lens D, to be shifted with relation to the frame of the film 6, and the easel E, without admitting extraneous light to the easel E. An enlarging lens D is so mounted as to permit of focusing and the necessary adjustments, as in the conventional type of cameras for enlarging purposes, and is fitted with an adjustable diaphragm.

The enlarging easel E is adjustable for alignment and size of the picture and has attached thereto photographic paper on which the enlargement is made. The further steps in the enlarging are the locating of the screen for size of the enlargement; alignment of the film, lens, and easel to avoid distortion of the image on the screen; focusing on the easel and stopping down the lens for definition; the exposure; and the finishing of the enlargement. In actual practice it is found that nine inches by twelve inches is a suitable size for the enlargement, but other convenient sizes may be used if desired. Other factors of the steps in the proposed method just described are identical with the present commercial practice in enlarging and therefore it is considered unncessary to dwell in further detail relative to them in addition to the novel steps above described.

When it is desired that lettering or other designations shall appear in the finished film, they are drawn in accordance with the methods of present commercial practice in drafting, using, however, inks or pigments, the tones of which present strong contrasts with the tones of that part of the enlargement upon which the lettering is to appear.

When the tones of the enlargement are neutral and when the tones quickly shift between light and dark, as is frequently the case, it is found that the style of lettering shown in Figure 4 will show clearly. In this lettering the body of the characters is executed with a dark pigment or a light pigment and is surrounded by a line made with a pigment or ink that is in the former case when light, and in the latter, dark. Lettering made up of alternate dark and light lines also shows well. All art work on the enlargement must be kept well within the limits of the frame, as appearing on the enlargement.

After such preliminary work, as is desired is done, the enlargement is mounted on the copying easel G, as shown in Figure 5, and the easel is placed with the enlargement before the motion picture camera F, in such a way that the frame of the enlargement exactly coincides with the aperture of the camera. If the camera used for copying is not the same as the one used for taking the original picture, the film from which the enlargement was made is placed inverted and in frame, with the emulsion side toward the lens, in the film channel of the camera, and the enlargement is shifted about until exact register is obtained between the image of the enlargement on the film in the camera and the objects on the frame of the film that is in the camera. Employing the methods of the present commercial practice in the making of titles, the next step is to shoot the desired footage and finish it.

The enlargement 1 having been made from the frame 2 of the film 5, the negative is cut at the frame line 3 or at the frame line 4 and the strip of film copied from the enlargement, or as much of it as it is desired to use, is spliced in, according to the commercial practice as an insert. The prints made from this negative will have the action arrested at the point where the insert was cut in.

A modification or variation of this method is to follow the steps as above described, except that the enlargement is made from the first frame of the scene and the copy is spliced onto the head of the scene to run as a title or subtitle.

Another variation is, instead of enlarging from a frame of the negative, in case only one or a few prints are desired, to enlarge from a frame of positive print and in copying to shoot directly onto the positive stock placed in the camera with the emulsion side away from the lens, the other steps being substantially the same as those already described.

I am aware that it is an old and obvious expedient within the art to project with a motion picture projector of commercial type and photographing the projected picture. However, by reference to the preceding description and illustrations, it will be clearly seen that I have not only clearly avoided the prior art but have provided a vastly improved and expedient method of accomplishing the desired result in a more efficient manner, such method consisting briefly in the preparation of an enlargement and the execution of lettering on the enlargement, and later photographing or copying same onto a motion picture film.

Having thus described my invention, I claim:

1. The method of preparing descriptive titles in motion picture films consisting in the photographic reproduction of a frame thereof, the execution of lettering on said reproduction, the production of a series of said reproductions as a titled film, and the introduction of said lettered frames into said film in a position directly adjacent the frame from which they were prepared.

2. The method of preparing descriptive titles in motion picture films, said method consisting in the enlargement of a frame of said film, the execution of lettering on said enlargement, the reproduction of a series of said lettered enlargements, the reduction of said lettered enlargements to their original size, and the introduction of said lettered enlargements into said film in a position directly preceding the frame from which said enlargements were prepared.

In testimony whereof I affix my signature.

LELAND H. STANFORD.